United States Patent [19]

Dougherty et al.

[11] Patent Number: 5,667,621
[45] Date of Patent: Sep. 16, 1997

[54] NON-AQUEOUS, ADHESIVE-FREE METHOD OF BONDING EXPANDED POLYMERIC PARTS

[75] Inventors: Thomas K. Dougherty, Playa Del Rey; Norman H. Harris, Newhall; James R. Chow, San Gabriel, all of Calif.

[73] Assignee: Hughes Aircraft Company, Los Angeles, Calif.

[21] Appl. No.: 444,638

[22] Filed: May 19, 1995

[51] Int. Cl.$^6$ ............................................ B32B 31/24

[52] U.S. Cl. .................... 156/275.7; 156/272.2; 264/413; 264/432

[58] Field of Search .................. 156/275.7, 272.2; 264/413, 432

[56] References Cited

U.S. PATENT DOCUMENTS

| | | | |
|---|---|---|---|
| 4,018,642 | 4/1977 | Pike et al. | 156/272 |
| 4,035,216 | 7/1977 | Immel | 156/273 |
| 4,253,898 | 3/1981 | Rinker et al. | 156/272 |
| 5,462,627 | 10/1995 | Oldham et al. | 156/275.7 |

*Primary Examiner*—Kathleen Choi
*Attorney, Agent, or Firm*—M. E. Lachman; M. W. Sales; W. K. Denson-Low

[57] ABSTRACT

Bonding of expanded polymeric parts together to produce lost foam molds suitable for casting metallic details is accomplished by applying a non-aqueous, adhesive-free coating comprising a polar, highly dielectric component contained in a liquid vehicle to the interfacing surface of at least one of the parts to be joined. The interfacing surfaces of the parts to be joined are held in contact while the assembly is irradiated with high frequency electromagnetic energy. This energy enables the coating to dielectrically heat the mated expanded polymeric parts until a bond is effected by melting the polymeric parts and inducing expansion of the parts into one another.

4 Claims, No Drawings

NON-AQUEOUS, ADHESIVE-FREE METHOD OF BONDING EXPANDED POLYMERIC PARTS

BACKGROUND OF THE INVENTION

1. Field of the Invention

The present invention relates to the bonding of expanded polymeric parts, and, more particularly, to an improved method for bonding expanded polymeric parts together by irradiating a non-aqueous, adhesive-free dielectric bonding composition interposed between the parts to be bonded with application of high frequency electromagnetic energy.

2. Description of Related Art

Industry commonly uses foam parts as patterns to form vaporizable molds which are then used to cast metal shapes in the "lost foam process". The lost foam process involves embedding a vaporizable pattern in sand, which then fills the hollows and recesses of the pattern. The pattern is typically made of vaporizable expanded polymeric parts, such as polystyrene, and is produced using conventional molding techniques. A molten casting material is poured into the embedded pattern, whereupon the heat of the molten material vaporizes the polymeric material making up the pattern. The gases produced upon vaporization escape into the surrounding sand. The result of this process, once the casting material cools and solidifies, is a casting in the shape of the pattern.

The automotive industry in particular uses the lost foam process to cast large and complex engine parts such as heads, blocks, and manifolds. Given the size and complexity of the vaporizable patterns required to yield such castings, the vaporizable patterns are commonly produced in a piecemeal fashion. Instead of attempting to produce a complex pattern in a single molding the patterns are produced by bonding together easily molded components. While the piecemeal approach simplifies the molding process, the bonding step introduces a new set of concerns to the lost foam process.

At least three techniques have commonly been used to bond expanded polymeric parts for use in the lost foam process. In one technique, a hot melt (thermo-plastic) adhesive is applied to the surfaces of the parts to be bonded. The parts are then mated prior to the cooling of the adhesive to achieve an effective bond, a step accomplished in automated processes with the use of specially designed fixtures. This technique is inconvenient for several reasons. First, the hot melt thermoplastic tends to flow into unwanted places on the polymeric parts as well as the surrounding work area, creating substantial messes and requiring costly clean up efforts. Second, a change in the shape of the parts necessitates a costly change in the fixtures, since the fixtures must mirror the configuration of the parts to be bonded. In addition to being inconvenient, this technique can damage or deform the polymeric parts by subjecting these parts to chemical attack from certain adhesive compositions.

In another technique, water is used to bond the parts rather than an adhesive. For example, U.S. Pat. No. 4,035,216, issued Jul. 12, 1977 to Richard H. Immel, discloses a method for bonding lost foam patterns together by wetting one or more surfaces to be bonded with a water/detergent mixture and subjecting the patterns while in a mated relationship to a high frequency electromagnetic energy. The polymeric parts are effectively transparent to the high frequency electrical energy, but the water serves as an electromagnetic susceptor compound, thereby absorbing the electromagnetic energy and converting it to thermal energy. As a result, the thermal energy heats the mated surfaces of the polymeric parts, causing them to melt and expand into each other to create a bond. The detergent is present at a concentration of up to about 2% to improve the wettability of water on the surface of the polymeric parts.

Using a water/detergent mixture to bond polymeric parts invites several problems. First, during casting, water remaining in the polymeric parts forms hydrogen, which in turn creates unwanted porosity in the metal castings subsequently produced from the lost foam process patterns. This porosity can dish the mechanical strength of the castings as well as mar their surface finish. Second, detergents introduce a release layer on the surfaces of the polymeric parts that impedes later efforts to perform secondary bonding or coating operations on the joined polymeric parts.

Finally, several patents describe a technique for bonding wherein an adhesive composition is cured with high frequency electromagnetic energy. For example, U.S. Pat. No. 4,253,898, issued Mar. 3, 1981 to William R. Rinker et al, describes a vinyl plastisol composition for microwave bonding of plastic parts. This process is dependent upon the melting of the plastic parts, which can deform the lost foam component and result in a mis-shaped metal casting. Additionally, the mere application of adhesive compositions on the polymeric parts can be damaging, since adhesive compositions may chemically attack the foam. Finally, the use of adhesive compositions commonly generates substantial messes requiring costly clean up efforts.

In another example using adhesive compositions, U.S. Pat. 4,018,642, issued Apr. 19, 1977 to Robert L. Pike et al, describes the use of phenolic resins in the microwave bonding of wood for the production of plywood type materials. As discussed regarding Rinker et al above, adhesive compositions in general can damage the plastic parts by chemical attack and can result in wasted time and effort expended toward cleaning inevitable spills and messes. Moreover, by employing phenolic resins in a casting process, one risks generating an undesirable residue in the casting. Notably, Pike et al make no inference with respect to the utility of bonding expanded polymeric parts with this technique.

Thus, a need exists for an improved method for bonding expanded polymeric parts for use in the lost foam process that avoids the above-mentioned problems and inconveniences wrought by using water or adhesive compositions in bonding.

SUMMARY OF THE INVENTION

In accordance with the invention, an improved method is disclosed for bonding expanded polymeric parts together which is non-aqueous and adhesive-free. The method comprises:

(a) providing at least two expanded polymeric parts to be bonded together;

(b) applying a coating to a surface of at least one of the expanded polymeric parts, wherein the coating comprises a non-aqueous, polar, high dielectric component in a non-aqueous polymeric vehicle;

(c) placing the coated surface in contact with at least one expanded polymeric part to produce a mated assembly free from relative movement;

(d) irradiating the mated assembly with high frequency electromagnetic energy for a time sufficient to effect a bond between the expanded polymeric parts making up the mated assembly; and (e) allowing the mated assembly to cool for sufficient time to set the bond.

Thus, the improved method for bonding expanded polymeric parts together involves the irradiation of a polar, high dielectric component that serves as a susceptor molecule, thereby converting the electromagnetic energy to thermal energy. The thermal energy generated expands and melts the surrounding polymeric parts and effects a bond. The electromagnetic energy can be in the form of either microwaves or radio frequency energy.

The improved method of the present invention exhibits several important advantages over processes using water as a susceptor molecule. First, the polar, high dielectric component does not produce hydrogen upon contact with molten metal that results in unwanted porosity and defects in the metal castings. Second, the method of the present invention does not require the use of detergents to enhance wetting so that detergent residue is not present to impede later efforts to perform secondary bonding or coating operations on the joined polymeric parts.

The improved method of the present invention is also advantageous in comparison to using adhesives to bond expanded polymeric parts. First, a user of the present composition need not contend with the difficulty of scrubbing away the residue of adhesive compositions, given the water-solubility of the present composition. Additionally, the present composition does not share an adhesive's propensity for chemically attacking expanded polymeric parts. Finally, the method of the present invention does not rely on extensive and unchecked deformation of polymeric parts for the creation of structural bonds. Rather, the method of the present invention localizes the application of heat at the bondline, such that given the low thermal transfer coefficient of foam, only the intended portion of polymeric parts is melted and expanded to form a structural bond.

In summary, the non-aqueous, adhesive-flee method for bonding expanded polymeric parts of the present invention provides a cleaner, more convenient method of producing lost foam molds. By providing an alternative to adhesive bonding, the method of the present invention circumvents damage to expanded polymeric parts caused by chemical attack and melting of the polymeric parts. Moreover, the exclusion of water from the present composition avoids damage to the subsequent metal castings due to hydrogen production. Importantly, the present method achieves these advantages without sacrificing the qualities essential to automated, high speed bonding applications, namely speed and environmental soundness.

DESCRIPTION OF THE PREFERRED EMBODIMENTS

The method of the present invention employs a non-aqueous, polar, highly dielectric component, mixed with a suitable non-aqueous vehicle, to provide a liquid composition which heats in less than two minutes, often in a matter of only seconds, when irradiated with high frequency electromagnetic energy.

In the practice of the present invention, the liquid composition is applied to the interfacing surface of at least one of the expanded polymeric parts to be joined. The interfacing surfaces of the parts to be joined are then held in contact while the assembly is irradiated with high frequency electromagnetic energy. The liquid composition converts the electromagnetic energy into thermal energy, thereby dielectrically heating the mated expanded polymeric parts until a bond is effected by melting the polymeric parts and inducing expansion of the parts into one another.

The material chosen to serve as the non-aqueous, polar, highly dielectric component, or "susceptor", must meet several requirements. First, the susceptor must not chemically attack the polymeric parts, even at higher operating temperatures. Second, the susceptor must have a relatively low vapor pressure. More specifically, the vapor pressure of the susceptor should not exceed about 10 mm at 20° C., with a vapor pressure less than 1 mm at 20° C. being preferred. Third, the susceptor should heat rapidly, meaning less than about two minutes, in an environment irradiated with high frequency electromagnetic energy and should also exhibit a boiling point of at least about 100° C. Fourth, the susceptor must have a dielectric constant ($\epsilon$) of at least about 10 at 20° C. to be considered as "highly" dielectric. Finally, in response to environmental concerns, the susceptor should be relatively non-toxic, meaning that the oral LD50 exceeds about 5 grams/kilogram and that the LC50 exceeds about 10,000 ppm. As is well-known, LD50 indicates the lethal dose for one-half of a population at the stated exposure, while LC50 refers to the lethal concentration in air for one-half of the stated population.

Polar liquids that can be used as susceptors include methanol, ethanol, propanol, lower aliphatic nitroalkanes such as nitromethane or nitroethane, formic acid, formamide, furfural, acetaldehyde, propylene carbonate, dimethyl carbonate, glycol, and ethylene glycol, among others. As an example, propylene carbonate has a vapor pressure of 0.13 mm at 20° C., a boiling point of 240° C., a dielectric constant of 43.8 at 20° C., and an oral LD50 of 29 grams/kilogram, making it an ideal susceptor for the practice of the invention.

The liquid vehicle used to carry the susceptor molecule serves to wet the expanded polymeric parts as well as to control the amount of microwave heating in the composition. As such the vehicle must meet several primary requirements. First, the compound chosen to serve as the vehicle must be able to dissolve the polar susceptor compound. Further, the vehicle must be non-viscous, preferably having a viscosity not exceeding about 1000 centistokes, and should wet the polymeric foam part without chemically attacking it. Finally, the vehicle should be relatively non-toxic. Examples of appropriate vehicles in the practice of the invention are low molecular weight polyethylene glycols, polyvinyl alcohol, polyvinyl acetate, and dioctyl phthalate, among others. As an example of a low molecular weight polyethylene glycol, a polyethylene glycol having an average molecular weight of about 600 is preferred in the practice of the present invention The ratio of dielectric component to vehicle employed in the practice of the invention necessarily varies by application. Accordingly, an optimally effective ratio may be determined by experimentation. Such experimentation, however, is not considered undue in view of the teachings herein. It is expected that the dielectric component should be present within the range of about 20 to 80 wt% of the total liquid composition.

The viscosity of the liquid composition comprising the susceptor and its liquid vehicle must not be so high that the mixture cannot be easily applied to the polymeric parts, nor must the viscosity be so low that the mixture tends to run excessively. The acceptable viscosity range for the liquid composition is about 5 to 100 centistokes. Preferably, the liquid composition is applied to the polymeric parts to a thickness ranging from about 0.0001 to 0.01 inches (0.00025 to 0.025 cm).

The type of high frequency electromagnetic energy used to irradiate the susceptor may be either microwaves or radio frequency energy. In the case of microwaves, the frequency may range from $10^8$ to $10^{12}$ Hertz, while radio frequency heating may be accomplished at frequencies ranging from $10^5$ to $10^9$ Hertz. Regardless of the type of energy employed it is important that a uniform energy field be applied to avoid hot or cold spots in the irradiated area. A uniform energy field may be achieved with the use of a microwave oven by simply rotating the part on a carousel during the application of microwaves. With particular regard to the use of microwaves, the power level required depends upon the mass of the polymeric part to be bonded as well as the amount of bonding material and the uniformity of the microwave field. For example, the 650 watts commonly available in small kitchen units may be acceptable for smaller applications, while commercial-size units ranging in power from about 1,300 to 5,000 watts or more may be required for larger parts. At any rate, insufficient power will heat the susceptor too slowly, thereby increasing the time required to achieve an acceptable bond. Moreover, a minimum level of power will exist for each particular application below which insufficient thermal energy is generated for bonding. In general, however, an output power within the range of 200 to 2,000 watts is sufficient to effect the bonding.

The time necessary to achieve bonding is very short, on the order of about 5 seconds to 2 minutes. The length of time required depends upon such variables as the size and mass of the polymeric parts being bonded, the exact ratio of susceptor to vehicle within the liquid composition, the intensity and frequency of the energy source, and the dielectric loss of the liquid composition employed. If the length of time employed is insufficient, an inadequate bond will result. On the other hand, if the length of time employed is excessive, the polymeric parts will be deformed in the vicinity of the bond line from melting and collapsing.

It is preferred that the bonded expanded polymer parts (or "foam") have been blown to the desired shape as near in time as possible to the execution of the bonding process. This increases the likelihood that an amount of blowing agent remains as a residue in the foam. The presence of a residue of blowing agent enhances the expansion of the foam parts and contributes to a properly fused bond.

In one particular embodiment of the invention, 50 parts of propylene carbonate are dissolved in 50 parts of polyethylene glycol having an average molecular weight of about 600 to form a liquid mixture, and the mixture is applied in a thin layer on the foam parts to be bonded. The foam parts are mechanically held together by fixtures with just sufficient pressure to prevent relative movement between the parts. The assembly is placed in a microwave oven with an output power of about 650 watts at a frequency of 2.45 gigahertz, which then heats the propylene carbonate by dielectric heating. Bonding is achieved in about 5 to 60 seconds, and the assembly should be allowed to cool for 60 seconds prior to removal from the fixtures. Foam parts undergoing this process have a strong uniform bond and should be suitable for application in the lost foam process.

After the polymer parts are bonded together, the pattern assembly is used to make a mold, typically using bondable sand as described earlier or ceramic materials. The mold itself includes runners for the introduction of the casting material. Molten metal casting material is poured into the mold via the runners, and the foam and residual bonding composition rapidly vaporize in the heat. No adhesive bond lines exist to hasten the flow of metal into the mold or the flow of vaporized foam and bonding composition out of the mold. Proper selection of the dielectric component and its accompanying vehicle reduce the chance of hydrogen evolution which causes defects in metal castings produced from the mold.

The process of the present invention affords several advantages. The non-aqueous, adhesive-free method for bonding expanded polymeric parts of the present invention saves time and labor by providing a cleaner, more convenient method of producing lost foam molds. Additionally, by remaining adhesive-free and non-aqueous, the process of the present invention averts damage to expanded polymeric parts caused by chemical attack as well as damage to subsequent metal castings stemming from hydrogen production. These advantages are achieved without sacrificing process speed, so that the invention remains wellsuited for use in automated, high speed bonding applications. Finally, the susceptor solution is environmentally compliant and has little if any impact on the health and safety of the working environment.

Thus, there has been disclosed an improved method for bonding expanded polymeric parts together which is non-aqueous and adhesive-free. It will be readily apparent to those of ordinary skill in this art that various changes and modifications of an obvious nature may be made, and all such changes and modifications are considered to fall within the scope of the invention, as defined by the appended claims.

What is claimed is:

1. A non-aqueous, adhesive-free method for bonding polymeric foam parts together, comprising:
   (a) providing at least two polymeric foam parts to be bonded together;
   (b) applying a coating to a surface of at least one of said polymeric foam parts, said coating comprising a non-aqueous, polar, high dielectric component comprising propylene carbonate in a non-aqueous vehicle comprising polyethylene glycol having an average molecular weight of 600;
   (c) placing said coated surface in contact with at least one polymeric foam part to produce a mated assembly free from relative movement;
   (d) irradiating said mated assembly with high frequency electromagnetic energy comprising microwave energy ranging in frequency from about $10^8$ to $10^{12}$ Hz for a time sufficient to effect a bond between said at least two polymeric foam parts; and
   (e) allowing said mated assembly to cool for sufficient time to set said bond.

2. The method of claim 1 wherein said coating is applied to said surface to a thickness ranging from about 0.0001 to 0.01 inches (0.00025 to 0.025 cm).

3. The method of claim 1 wherein said time sufficient to effect a bond ranges from about 5 to 60 seconds.

4. The method of claim 3 wherein said mated assembly is radiated with microwaves by placing said mated assembly in a microwave oven having an output power ranging from about 200 to 2,000 watts and exposing said mated assembly to said microwave energy.

* * * * *